(12) United States Patent
Welsh

(10) Patent No.: US 7,899,493 B2
(45) Date of Patent: Mar. 1, 2011

(54) SHARING A RADIO FREQUENCY INTERFACE RESOURCE

(75) Inventor: Linda Bucsay Welsh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/496,830

(22) Filed: Jul. 2, 2009

(65) Prior Publication Data

US 2009/0290490 A1    Nov. 26, 2009

Related U.S. Application Data

(63) Continuation of application No. 10/331,687, filed on Dec. 30, 2002, now Pat. No. 7,574,233.

(51) Int. Cl.
*H04M 1/00* (2006.01)

(52) U.S. Cl. ................................. 455/556.1; 348/14.01

(58) Field of Classification Search .............. 455/435.3, 455/512, 556.1, 557; 348/14.01–14.04; 370/230
See application file for complete search history.

(56) References Cited

U.S. PATENT DOCUMENTS

| | | | | |
|---|---|---|---|---|
| 5,574,977 | A | 11/1996 | Joseph et al. | 455/450 |
| 5,615,249 | A | 3/1997 | Solondz | 455/450 |
| 5,752,193 | A | 5/1998 | Scholefield et al. | 455/452.2 |
| 6,064,438 | A | 5/2000 | Miller | 349/465 |
| 6,115,613 | A | 9/2000 | Jonsson | |
| 6,177,931 | B1 | 1/2001 | Alexander et al. | |
| 6,208,865 | B1 | 3/2001 | Veerasamy | 455/450 |
| 6,282,429 | B1 | 8/2001 | Baiyor et al. | 455/512 |
| 6,363,434 | B1 | 3/2002 | Eytchison | |
| 6,459,906 | B1 | 10/2002 | Yang | 455/556.1 |
| 6,597,920 | B2 | 7/2003 | Yegani et al. | 455/512 |
| 6,603,428 | B2 * | 8/2003 | Stilp | 342/457 |
| 6,738,637 | B1 | 5/2004 | Marinho et al. | 455/512 |
| 6,751,465 | B2 | 6/2004 | Nakada | 455/512 |
| 7,003,791 | B2 * | 2/2006 | Mizutani | 725/21 |
| 2002/0168178 | A1 | 11/2002 | Rodriguez et al. | |
| 2003/0046393 | A1 | 3/2003 | Mueller et al. | 709/225 |
| 2003/0054833 | A1 * | 3/2003 | Hayduk | 455/456 |
| 2004/0062295 | A1 | 4/2004 | Khawand et al. | 375/130 |

FOREIGN PATENT DOCUMENTS

| | | |
|---|---|---|
| EP | 0 964 332 | 12/1999 |
| EP | 1 205 847 | 5/2002 |
| JP | 2002-237843 | 8/2002 |
| JP | 2002-540739 | 11/2002 |
| WO | WO 00/59230 A1 | 10/2000 |

OTHER PUBLICATIONS

English Language Translation of an Office Action of the Japanese Patent Office in a related foreign application, Mailed Jun. 10, 2008, pp. 1-3.
Japanese Patent Office Final Rejection dated Jan. 28, 2009 in a related application.

* cited by examiner

*Primary Examiner* — CongVan Tran
(74) *Attorney, Agent, or Firm* — Trop, Pruner & Hu, P.C.

(57) ABSTRACT

Applications may seek access to a radio frequency interface resource on a processor-based system that exceeds the available capacity of that resource. When more than one application needs access to an RF interface resource at the same time and the available capacity of the RF interface resource does not permit all these requests to be granted, contention resolution may be provided. In one embodiment, the contention resolution may involve determining the priority of each application seeking RF interface resource access and granting access based on that priority.

24 Claims, 5 Drawing Sheets

SHARING A RADIO FREQUENCY INTERFACE RESOURCE

This application is a continuation of U.S. patent application Ser. No. 10/331,687, filed Dec. 30, 2002 now U.S. Pat. No. 7,574,233 entitled "SHARING A RADIO FREQUENCY INTERFACE RESOURCE," the content of which is hereby incorporated by reference.

BACKGROUND

This invention relates generally to radio frequency (RF) interface resources that provide access to media.

The phrase "RF interface resource" refers to the hardware and software components of transmitters, receivers, and transceivers used by applications to send or receive signals communicated over the radio frequency range of the electromagnetic spectrum, or to process data carried in those signals, or communicated through other means such as over a traditional data network or through a software interface. This data can be in the form of audio, video, voice, data, or any combination thereof. Examples of applications that use media carried over RF signals include TV viewing, music radio listening, and voice/data communication and exchange. RF signals may be carried over a variety of communications links including over-the-air terrestrial sources, satellite sources, and wireless communications networks. In addition to being carried over RF frequencies, data processed by RF interface resources may be communicated in the form of packet-based data carried over traditional copper wire or optical fiber based data communications networks. For example, the data processed by an RF interface resource may be communicated as signals over a television antenna, a DSL modem, a cable modem, a coaxial cable TV connection. Alternatively, data processed by an RF interface resource, such as an MPEG-2 transport stream processed by a demultiplexer, may be carried as data communicated over a USB connection, by a network interface card (NIC) or even through a software programming interface.

A personal computer (PC) may have a television (TV) add-in card installed, which provides TV program viewing on the PC. In addition to viewing of TV as it is broadcast, many of today's newer cards provide video cassette recorder-like functions such as recording TV programs when aired for later viewing, using the hard disk for storage of the program. Some TV cards provide support for both analog and digital television viewing. Particularly with the advent of digital television, TV signals can also carry data services, in addition to normal TV programs. Some examples of data service applications include the delivery and download of movies, music, software, games, news, and Internet content. The applications receiving this content can be customizable according to user preferences to only receive the content the user is interested in. Just like TV programs, these data services may be scattered across many different RF frequencies or "TV channels."

Conflicts arise between multiple applications wanting to tune to different TV channels at the same time. A TV program recording application may want to tune to channel 3 to record a preselected program, at the same time the user is watching TV with the TV viewer application on channel 5. At the same time, a PC games download service application might need to turn to channel 10 to get the game the user asked for. The first conflict in this example is over which application gets to tune the tuner to its channel. Even if the system had three independent tuners, each with its own demodulator and demultiplexer, a second conflict could occur over the use of a common decoder needed to convert protected or encrypted content into a form useable by each application.

Because current systems allow each application to get direct access to these resources, one application can interfere with the correct operation of other applications, leaving the user clueless as to why a problem occurred. For instance, the TV viewer application, because it lets the user change the TV channel whenever she wants to, may make it impossible for the TV recording application to record desired programs, and the PC games service to successfully download a game (even though the user has paid money for the service). Because of conflicts over the use of these shared resources, the user is usually left completely in the dark as to why the other applications fail (especially if they were the reason why the user invested in a TV card to begin with). The result is equally unsatisfying for data service providers and operators who depend on content being successfully downloaded in order to collect revenue.

Thus, there is a need for ways to resolve contention when the number of active applications requiring the use of an RF interface resource exceeds the number of available RF interface resources.

DETAILED DESCRIPTION

Figure 1:
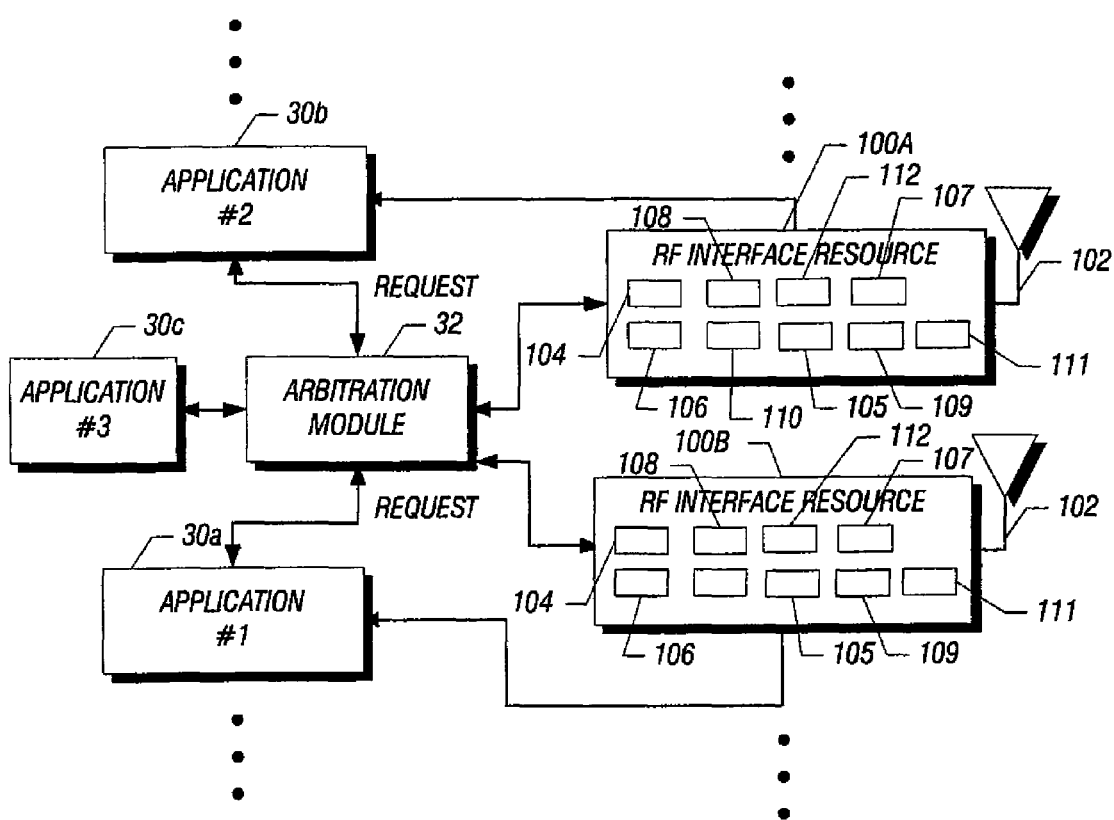
FIG. 1 is an operational depiction of one embodiment of the present invention.

Referring to FIG. 1, a platform may include one or more radio frequency (RF) interface resources, such as resources 100A and 100B, each coupled to a unidirectional or bi-directional communication link interface 102. Signals and data may be carried over a variety of communications links including over-the-air terrestrial sources, satellite sources, wireless communications networks, and copper wire or optical fiber based data communications networks. Examples of the communication link interface 102 used by the RF interface resource to communicate the signals and data it processes include: a television antenna, a DSL modem, a cable modem, a coaxial cable TV connection, a USB connection, a network interface card (NIC) or an application programming interface API or other software interface mechanism to communicate data between the RF interface resource 100 and a software program or the operating system. The resources 100A and 100B may be transmitters, receivers, or transceivers, or the individual components thereof such as one or more of the following: a tuner 104, an encoder 105, a decoder 105, a multiplexer 106, a demultiplexer 107, an encryptor 108, a decryptor 109, a modulator 110, and a demodulator 111.

The RF interface resources 100 may be coupled to an arbitration module 32. The arbitration module 32 receives all requests for the resources 100 from applications, such as the applications 30a, 30b, and 30c, that are active on the platform. The arbitration module 32 controls access to and from the radio frequency interface resource 100. In some embodiments, the arbitration module 32 may be a software component and, in some cases, it may be a portion of an operating system. The arbitration module 32 may allow access to the resources 100 on a selective basis. The arbitration module 32 enforces a priority scheme to decide which application 30 is granted access to one or more RF interface resources 100.

It should be understood that in some cases N resources may be accessible to M applications where M is greater than N. Thus, contention may result and the arbitration module 32 may be responsible for serving up access to the N resources by the M applications according to a priority scheme.

Some embodiments of the present invention may support a multitude of media services transmitted or received at different times and over different radio frequencies, in an environment constrained by a limited number of RF interface resources.

Media, in the form of audio, video, voice or data, or any combination thereof, can be communicated over signals carrying data. Examples of how signals and data may be carried include over-the-air terrestrial or satellite transmission, and copper wire or optical fiber networks. An example of a media service is the delivery of Video-On-Demand application where movie content is delivered in an MPEG-2 transport stream to a PC or Set top box for viewing. Another example of a media service is a rich multi-media Internet application where content is delivered to a cell phone or personal digital assistant (PDA). Another example of a media service is a gaming or software application where games or other software is delivered to a handheld or portable computer, a desktop PC, or a wireless appliance. Still another example is an MP3 music or MPEG-4 video content is received on your mobile phone or PDA, or the reverse, where pictures captured and uploaded by your mobile phone or PDA are transmitted to someone else.

A variety of media services may be provided as a variety of RF frequencies or "channels," just as there are many television channels for TV programs. In fact, television programming is just another example of a media service, where the media is television programs, which are delivered on a plurality of RF frequencies reserved for television. In addition to carrying television programs, those same television RF frequencies can also be used to carry other media services like the Video-On-Demand or other data services mentioned above. Unlike television programming in general though, media services need not be delivered on continuous, 24×7 basis. Rather, some media services may only be available at particular time periods. This is frequently the case for data services now being delivered over analog and digital television. Data content, which could include things like video, games, software, Internet, news, stock listings, etc, is often broadcast during discrete, noncontiguous blocks of time throughout the day. Even where data services are broadcast on a continuous basis, data is usually rebroadcast repeatedly over a time period to ensure that the data gets received. Many media service applications tailor what content is actually received to match user preferences, meaning, some content is deliberately skipped or ignored.

As an example, platforms, such as televisions, PCs, PDAs, or mobile phones phones, having only a single radio frequency tuner, can only be tuned to a single radio frequency carrier at a time. In some cases, more than one of a given type of RF interface resource is provided, but even so, any given platform can only receive or transmit on a finite number of radio frequencies at any given time, and be similarly restricted on the number of data signals it can process simultaneously, as many as the number of give resources allow. In practice, the number of concurrent uses for RE interface resources will always exceed the number of RF interface resources available in any practical system.

When services which use different RE frequencies attempt to operate concurrently, conflicts may arise over the RF interface resource used to receive or transmit content. Similar conflicts between applications may arise over a particular resource, like an encoder or decoder used to process content for viewing, rendering, or play back, after it has been received or before it will be transmitted. These conflicts may arise because more than one application may require the use of the same RF interface resource at any given time. For example, three different data service applications may compete for the TV tuner, each wanting to tune to its channel to receive its content. When the number of simultaneous requests for resources exceeds the number of available RF interface resources, a problem arises.

In one embodiment, the contention resolution may involve determining the priority of each application seeking RF interface resource access and granting access based on that priority. Priority is the recognized right to precedence of one application over another, for example by order of urgency or importance. Priority may be assigned in any viable way. In some embodiments, priority can be based on any number or combination of factors, including but not limited to: user preferences; whether an application is paid for or free; the order in which an application appeared, was selected or installed; when or where an application is available; whether an application is essential to the operation of the device; or whether an application requires other hardware or software resources that may or may not be present on the system. Priority may be assigned by the user, the application, or the system, or any combination thereof, to mention a few examples.

Figure 2:
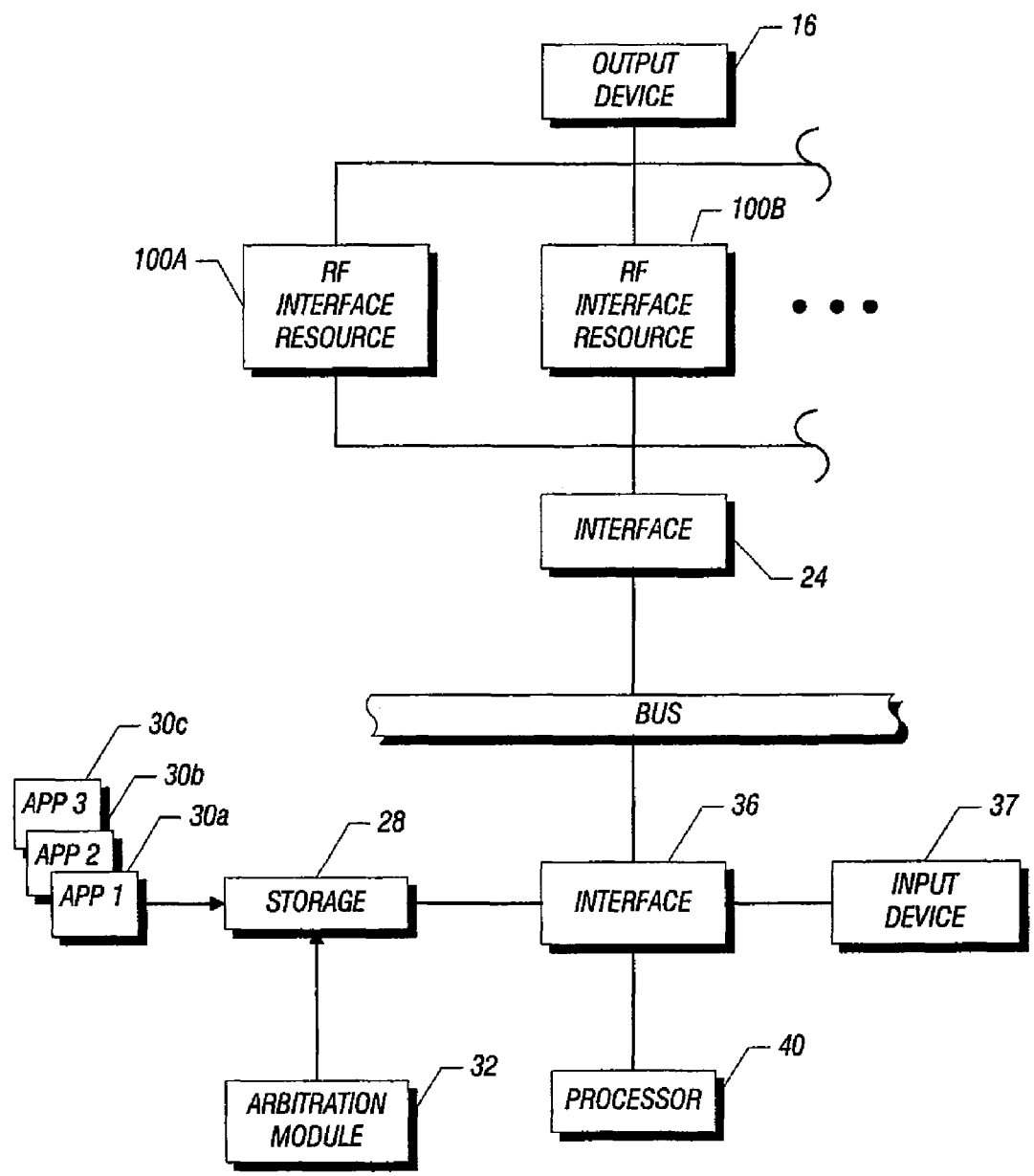
FIG. 2 is a block depiction of one embodiment of the present invention.

Referring to FIG. 2, a processor-based RF reception platform 10 may include a processor-based system 12. The system 12 may include the RF interface resources 100 and the arbitration module 32 in one embodiment. The system 12 may be a personal computer, a set top box, a PDA, or a mobile phone, to mention a few examples. The system 12 may be coupled to an output device 16, such as a display system, such as a television or a computer monitor, a built-in display such as an LCD panel, or may simply use a speaker for output. The system 12 may be coupled to or include an input device 37, such as a keyboard, keypad, mouse, touchpad, pointing device, remote control unit, or microphone for receiving commands and inputs from the user The input device 37, in one embodiment, may be used to change channels on a system with a broadcast TV receiver. A signal may be received by an interface 100 from an antenna, a satellite receiver, a cable receiver or a computer network including the Internet, to mention common examples. The data processed by the RF interface resource 100 may even be communicated by another application via a software programming interface.

An RF interface resource 100, in one embodiment, may be a television add-in card on a PC comprising a tuner, demodulator, demultiplexer or decoder. Some embodiments may arbitrate the use of these components individually, or in groups of one or more components. An RF interface resource 100 may be implemented in hardware, or software or in any combination of hardware and software.

The system 12 may include an interface 24 that interfaces the system 12 with the resources 100. The interface 24, in one embodiment of the present invention, may be coupled to a bus 26, in turn, coupled to an interface 36, that may be a bridge in one embodiment. The interface 36, in one architecture, may be coupled to a storage 28, a processor 40, and the input device 37. While in one embodiment the output device 16 may act as the display for the processor-based system 12 and the display for media, in other embodiments, separate displays may be available. In addition, while one architecture for a processor-based system 12 is shown in FIG. 2, the present invention is applicable to any available architecture.

The storage 28, in one embodiment of the present invention, may be a hard disk drive (HDD) or a non-volatile storage device such as flash memory. The storage 28 may store a plurality of applications 30 requiring access to RF interface resources 100. In addition, a resource arbitration module 32 may also be stored on the storage 28.

In accordance with one embodiment of the present invention, contention between applications 30 seeking access to the interfaces 100 may be resolved in an advantageous fashion. This contention may arise because multiple applications 30 may wish to access the same RF interface resource at the same time so that the number of requests exceeds the capacity of the system's available resources.

Figure 3:
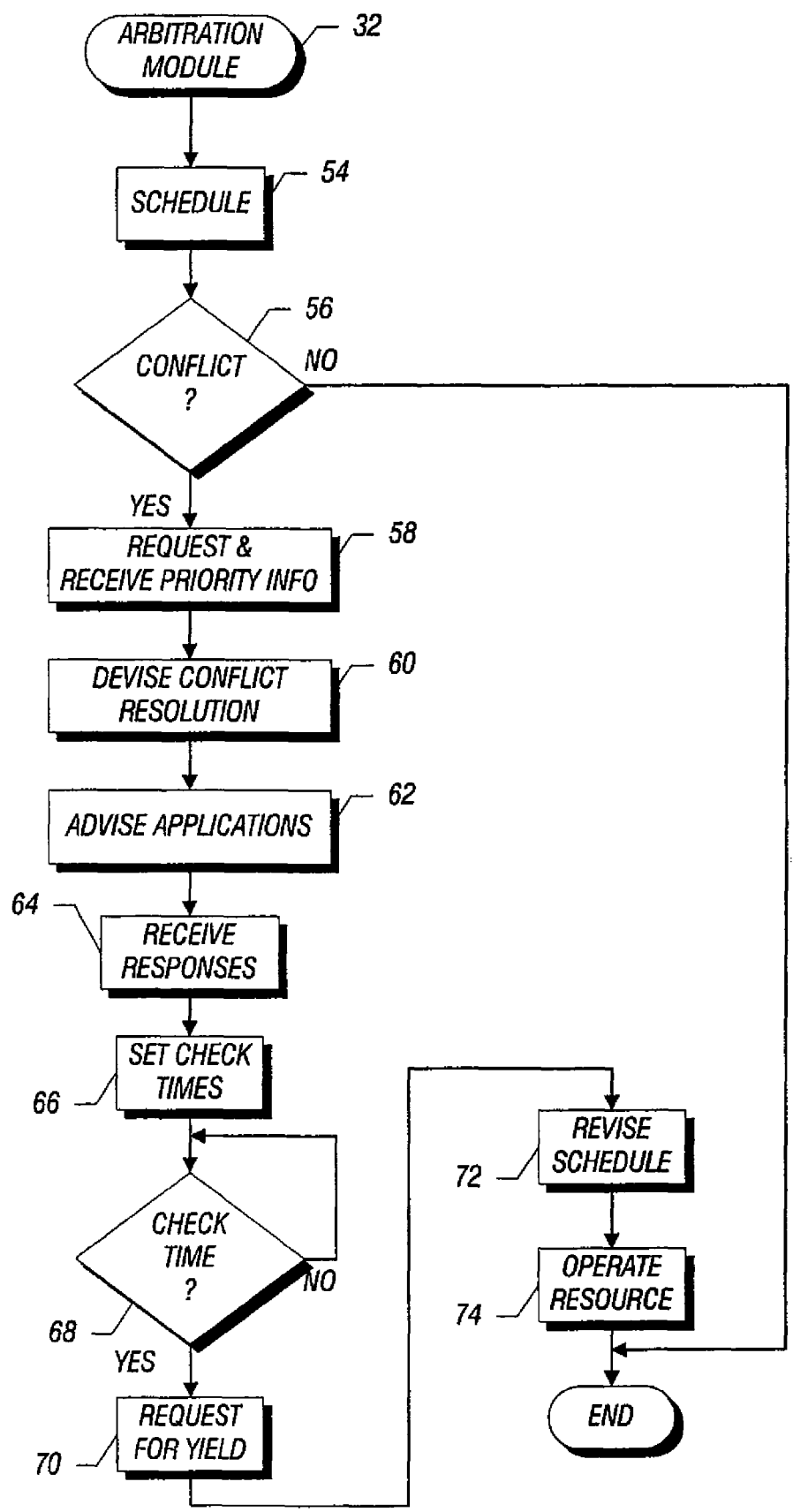
FIG. 3 is a flow chart for software in accordance with one embodiment of the present invention.

Referring to FIG. 3, the arbitration module 32 controls the ability of applications 30 to access the resources 100. The requests for the resources are scheduled as indicated in block 54. A schedule is provided that reserves given time slots for given resources as requested by various applications 30 in accordance with one embodiment of the present invention. In one embodiment, applications 30 may be assigned time slots to access resources needed to receive data that they expect to be broadcast, for example, based on an available schedule of data service broadcasts.

A check at diamond 56 determines whether a conflict exists. A conflict or contention arises when two different applications 30 request access to a limited number of resources 100 at the same time and the requested number of resultant resource usage requests to receive the data services exceeds the capacity of the system 10, such as requests to tune to three different television channels by three applications, when only two television tuners are present to mention one common example. Some other common example would be conflicting requests over: an HDTV demodulator, an MPEG-2 transport stream demultiplexer, or an MPEG-4 decoder. If no conflict arises, the flow simply grants use of the resource 100 according to the prearranged schedule as indicated in block 74.

If a conflict is identified, in accordance with one embodiment of the present invention, the arbitration module 32 may issue a request to the various applications 30 to indicate their priorities. Alternatively, that priority information may already reside in the arbitration module 32 or may be separately accessible by the application 30 from a database, or may require prompting of the user to supply information, as additional examples.

The priority information may be received from the applications 30, in accordance with one embodiment of the present invention, as indicated in block 58. In accordance with one embodiment of the present invention, a conflict resolution may be devised based on the relative priorities of different applications 30 as indicated in block 60. For example, in the situation where two applications 30 are requesting resources in the same time period and sufficient resources are not available to provide all requests, the system 10 may allocate the resource based on the priority of different applications 30. Namely, the application 30 with a higher priority gets the requested resource, if available.

In such case, the applications 30 that receive the requested resource are so advised, as indicated in block 62, and those applications which did not receive the requested time slots are also apprised. In some cases, responses to the allocation may be received from applications 30 in block 64. In such cases, these responses may advise the application 30 that while the request was made for a given time slot, the application 30 still wants that time slot or some part thereof if it subsequently becomes available. Also, a given application 30 may advise the arbitration module 32 that the application 30 may be able to use less than all of the available time that it requested. As still another alternative, some applications 30 that receive priority may advise that they may be able to yield that priority over a portion of the allocated time period.

The circumstances that permit a given application to yield its allocation are various. As one example, an application may receive sufficient information in less than the entire allocated time period to enable it to achieve the function that it needs to achieve. In such case, the application may then yield its allocation after receiving all the data it needs.

As indicated in block 66, check times are set. The check times are times developed based on the application responses to re-check if an application that received the allocation may be able to yield all or part of the allocated resource. Even though the contention may be resolved by assigning the resource based on priority, a recheck may have been requested by an application to determine whether another application subsequently can yield its allocated resource. As one example, in some cases, the same content may be repeatedly broadcast. An application 30 may therefore receive the information it intended to access in a given time slot, at an earlier time and therefore may be willing thereafter to yield its resource allocation.

A check at diamond 68 determines whether a check time has arisen. The check time may correspond to the time of the resource contention or may be slightly before or even after that time.

At block 70, when the check time has arrived, a request for yield may be provided to the higher priority application, as indicated in block 70. If the yield request is granted, the schedule may then be revised as indicated in block 72. Thereafter the interface 14 is operated according to the schedule as indicated in block 74.

In some embodiments the arbitration module 32 may be part of an operating system, layered on top of an operating system, an application program, or part of an application program interface (API). Examples of RF interface resources that are arbitrated include a tuner, a demodulator, a modulator, a demultiplexer, a multiplexer, an encoder, a decoder. Encoding and decoding can mean converting data from one format to another, or converting data from an encrypted format to an unencrypted format. The arbitrated or exclusive use of these resources by applications may be controlled individually, as individual resources, or as a combination several components combined into one logical resource. In some embodiments, it may not make sense to have access to the tuner, without access to the demodulator, demultiplexer, and decode components as well, hence, they may be bundled together as a single logical resource. In other embodiments, it may make sense to keep components separate, to allow concurrent use of all components in certain combinations—e.g. those needed for reception for storage and later playback, versus those components needed just for playback (of previously recorded content). The granularity or scope of resource arbitration that would be appropriate depends on the needs and purposes of the particular system and its applications.

Figure 4:
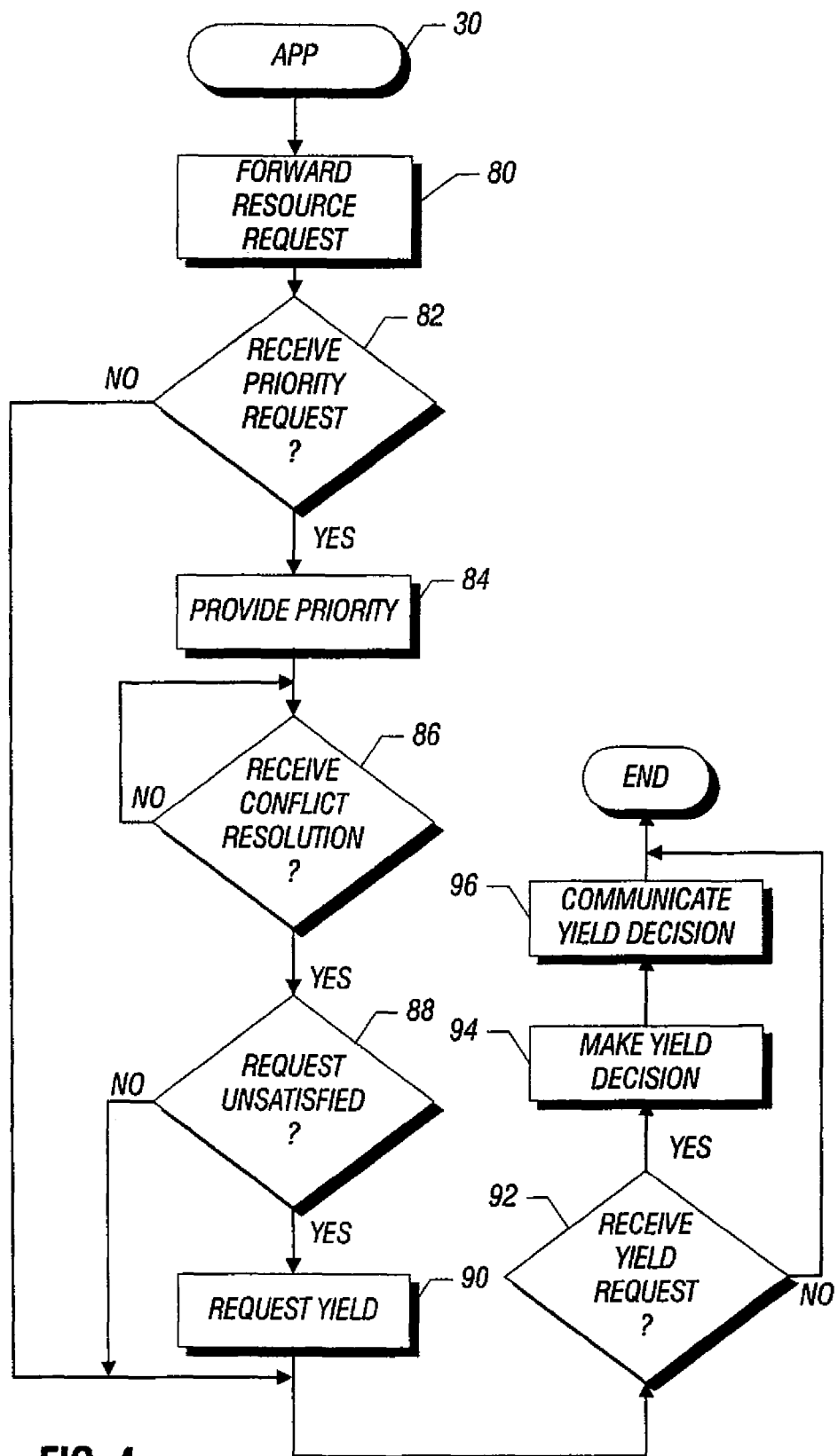
FIG. 4 is a flow chart for software in accordance with another embodiment of the present invention.

Each of the applications 30 may include a module that interconnects with the arbitration module 32, in accordance with one embodiment of the present invention, as shown in FIG. 4. Initially, each application 30 forwards a resource request to the arbitration module 32 as indicated in block 80. Thus, based on available scheduling information, a given application 30 knows that it needs to a resource for a particular time period. Therefore, the application 30 makes the request for this resource to the arbitration module 32.

Thereafter, the application 30 eventually receives a request for priority information from the arbitration module 32, if a conflict arises. If no priority request is received then it may be determined, after the passage of time, the request was granted. If a priority request is received, as indicated in diamond 82, the requested priority information may be provided from the application 30 in one embodiment, as indicated in block 84. Thereafter, the resource requesting application 30 receives a conflict resolution as determined in diamond 86.

If the request is unsatisfied, as indicated in diamond 88, a yield may be requested in some cases as indicated in block 90. For example, if the application 30 determines that it must have the resource if at all possible, it can formulate an appropriate yield request to the arbitration agent 32. The application 30 then awaits a decision on the yield request.

Simultaneously, a higher priority resource allocated application may receive yield requests from the arbitration agent 32, as indicated in block 92. If a yield request is received, an application 30 makes a yield decision as indicated in block 94. It then communicates that yield decision to the arbitration agent 32 as indicated in block 96.

As two examples, an application may yield when it either has processed all the data it needs or the data it still does not have may be communicated in a future time slot where there are no conflicts. Either condition may be known by the potentially yielding application, the system 12 or both. For the application to know that it has processed all the data it needs to, additional metadata, like a data manifest that lists all the necessary data resources, may be provided. The application 30 may have received all of the data it needs as determined from the manifest, and the data may be communicated repeatedly.

Metadata may also indicate what data is essential, which data is optional and which is available by other means. As an example, a video on demand application may not yield if it was receiving a movie it knows the user wants, but it may yield if it knows its cache is already full of next week's movie trailers and that is what is being rebroadcast now.

An application 30 (or the system 12 itself) may know that a resource may not be needed until a future time due to the availability of scheduling information which indicates when data may be communicated. This scheduling information may be made available in a variety of fashions, including system information carried in the signal itself, or the use of electronic programming guides. Information about what data will be communicated repeatedly and when may be simply additional metadata that may be exposed to the application or system in order to determine whether a yield can happen.

Figure 5:
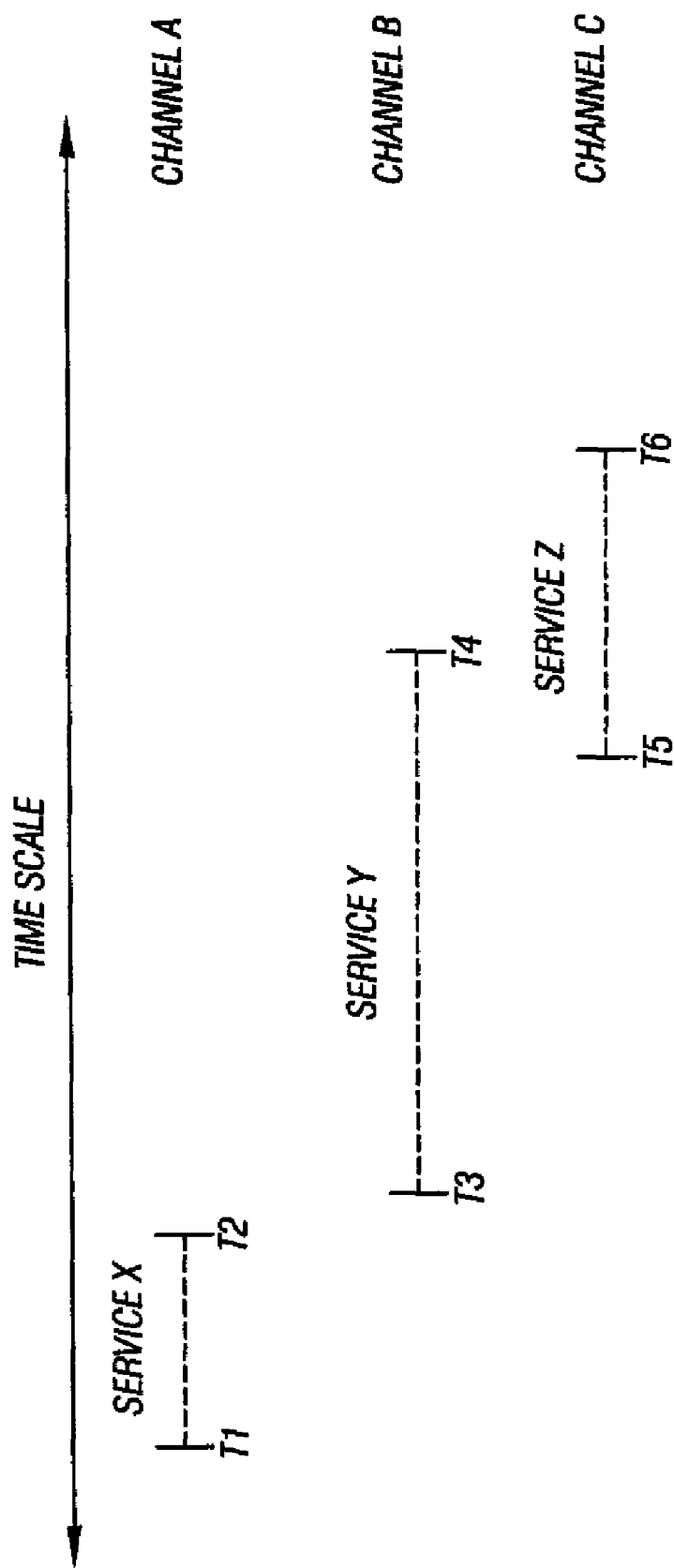
FIG. 5 is a schematic illustration of a potential contention situation resolvable with one embodiment of the present invention.

In FIG. 5, depicting one embodiment, there are three data services X, Y and Z being offered on three different physical channels A, B and C which represent three different RF television frequencies. It may be assumed that the time scale covers twenty-four hours and each service time period is repeated at the same time every day. It can also be assumed that the system 12 has only one television tuner that can be controlled exclusively by one application at a time.

If all service applications X, Y and Z start running at system start time, each service requests the system to tune to its respective channel during its requested time slot. The service X request would be granted unconditionally because there are no competing application resource requests. The service Y and Z's request would be handled based on the respective priorities in one embodiment. If service Y has a higher priority, then its request would be granted unconditionally and the television tuner 14 would be tuned to channel B starting at time T3 for as long as service Y wants the bandwidth up until time T4. Service Z would not have a chance at the television tuner until time T4 (or sooner if the service Y yields the tuner before then).

If the service Z has a higher priority than the service Y, the platform 10 may respond in one of two ways in one embodiment. The platform 10 may tell the service Y that it may tune to channel B until time T5, leaving the choice of whether to tune there at all to the service Y. The service Z would definitely get its data on channel C starting at T5 until T6. If the service Y does not want the tuner as long as it can get it, shortly before the time T5, the system may check with service Z to determine if the service Z is willing to yield until time T4. If the service Z is willing to yield, the system may stay tuned to channel B until time T4. If the service Z is not willing to yield, the platform 10 may tune to channel C at time T5. If the service Z yields the tuner anytime before time T4, the system may see if service Y still wants the bandwidth, and if so, turn back to channel B.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving radio frequency interface resource requests on a platform from at least two applications that create contention because the platform does not have the resources to grant both requests;
   determining the priority of the at least two applications;
   based on the priority, granting one of said resource requests for a period of time; and
   determining if the granted resource can be yielded before the end of the period of time.

2. The method of claim 1, further comprising receiving at least two requests for access to a resource and scheduling those requests automatically.

3. The method of claim 2, further comprising determining when two applications request access to the same resource.

4. The method of claim 3, further comprising obtaining priority information from the requesting applications.

5. The method of claim 3, further comprising obtaining priority information from one of a database and the user.

6. The method of claim 2, further comprising advising the requesting applications of granting the resource request of one of said applications.

7. The method of claim 6, further comprising receiving a response to the granting of the resource request from an application whose request was not granted.

8. The method of claim 7, further comprising, in response to said response from said application whose request was not granted, requesting that the application, whose request was granted, yield the resource to an application whose request was not granted.

9. The method of claim 8, further comprising automatically setting a time to request that an application yield its priority to another application.

10. The method of claim 9, further comprising setting the time to request an application yield close in time to the time of the schedule contention.

11. The method of claim 8, further comprising:
   based on the priority, granting one of said resource requests to a first of the at least two applications and denying another of said resource requests to a second of the at least two applications; and
   automatically setting a time to request that the first of the at least two applications yield its priority to the second of the at least two applications.

12. The method of claim 1, wherein determining if the granted resource can be yielded before the end of the period of time comprises determining if the resource can be yielded by an application among the at least two applications.

13. The method of claim 1, wherein determining if the granted resource can be yielded before the end of the period of time comprises determining if the resource can be yielded by an application with a granted resource request.

14. The method of claim 1, wherein at least one application performs functions selected from a group consisting of: TV recording or viewing, music radio recording or listening, video content recording or playback, voice or data communication and exchange, and delivery or download of: movies, music, software, games, news, and/or Internet content.

15. A system comprising:
   a processor; and
   a storage storing instructions that enable the processor to receive radio frequency interface resource requests from at least two applications, which are each already active on a platform that includes the processor, that create contention because the system does not have the resources to grant both requests, determine the priority of each already active application, based on the priority, grant one of the resource requests for a period of time, and determine if the granted resource can be yielded before the end of the period of time.

16. The system of claim 15, further comprising at least one of a broadcast receiver, a television receiver, and a radio receiver.

17. The system of claim 15, further comprising one of: a set top box, a personal digital assistant, a desktop computer, a portable computer, a handheld computer, a media server, a media gateway, a mobile phone, a wireless appliance.

18. The system of claim 15, further comprising: a radio frequency interface resource coupled to said processor, said resource including at least one element selected from the group including a tuner, a modulator, a demodulator, a multiplexer, a demultiplexer, an encoder, or a decoder.

19. The system of claim 15, further comprising: a first resource of a particular type, said type being from the group including a tuner, a modulator, a demodulator, a multiplexer, a demultiplexer, an encoder, a decoder, or any combination thereof, said resource coupled to said processor.

20. The system of claim 19, further comprising: a second resource of substantially the same type as said first resource.

21. The method of claim 1, further comprising automatically setting a time to request that an application, having a first priority, yield its priority to another application, having a second priority, while at the time of the request the first priority is higher than the second priority.

22. The method of claim 1, further comprising receiving the radio frequency interface resource requests on the platform from the at least two applications after the at least two applications are already active on the platform.

23. The method of claim 1, further comprising:
   based on the priority, granting one of said resource requests to a first of the at least two applications and denying another of said resource requests to a second of the at least two applications; and
   determining if the granted resource can be yielded by the first of the at least two applications to the second of the at least two applications before the end of the period of time and while the first of the at least two applications is still active.

24. The method of claim 1, further comprising receiving at least two requests for access to a resource and respectively scheduling those requests at first and second time periods that overlap with each other.

* * * * *